United States Patent [19]

Hertz

[11] 4,158,225
[45] Jun. 12, 1979

[54] ROTARY DYNAMOELECTRIC MACHINE HAVING HIGH-RESISTANCE ROTOR

[75] Inventor: Claude M. Hertz, Taylorville, Ill.

[73] Assignee: Ronk Electrical Industries, Inc., Nokomis, Ill.

[21] Appl. No.: 772,523

[22] Filed: Feb. 28, 1977

Related U.S. Application Data

[63] Continuation of Ser. No. 606,588, Aug. 21, 1975, abandoned.

[51] Int. Cl.² .............................................. H02M 5/00
[52] U.S. Cl. ..................................... 363/150; 310/211
[58] Field of Search ............... 310/166, 211, 212, 169, 310/170, 171, 160, 161; 321/55, 57; 318/218, 219

[56] References Cited

U.S. PATENT DOCUMENTS

| | | | |
|---|---|---|---|
| 919,524 | 4/1909 | Barnholdt | 310/211 |
| 919,527 | 4/1909 | Bergman | 310/212 |
| 2,808,552 | 10/1957 | Voege | 308/211 |
| 3,670,238 | 6/1972 | Ronk | 321/55 |

*Primary Examiner*—Donovan F. Duggan
*Attorney, Agent, or Firm*—Koenig, Senniger, Powers and Leavitt

[57] ABSTRACT

A rotary dynamoelectric machine having a generally annular polyphase stator with a predetermined number of wound poles and an induction rotor. The rotor has a cylindrical laminated ferromagnetic core positioned within the stator for rotation about a central axis thereof when the stator is energized by an a.c. power source. The rotor is of squirrel-cage construction having a plurality of electrically conductive bars each extending the length of the core adjacent the cylindrical surface thereof. Conductive end rings at the ends of the rotor are electrically connected to the ends of the bars at the respective ends of the core. The end rings have a plurality of radial slots therethrough thereby forming a plurality of spaced arcuate ring segments whereby the rotor has a relatively high resistance, e.g., at least three times that of such a squirrel-cage rotor with unsegmented end rings. The stator windings may be interconnected with a source of single-phase a.c. power source to permit the machine to be used as a self-starting rotary phase converter for supplying three-phase power to a load or they may be connected to a single or polyphase a.c. power source to provide a motor having low inrush current and high starting torque.

16 Claims, 12 Drawing Figures

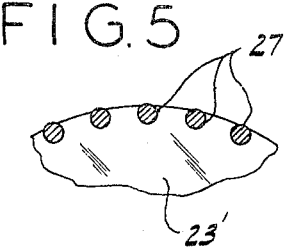
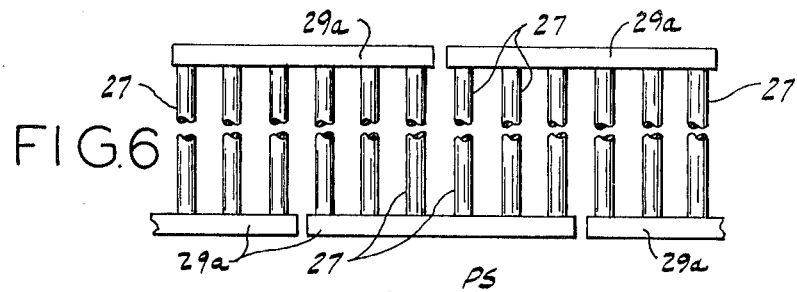
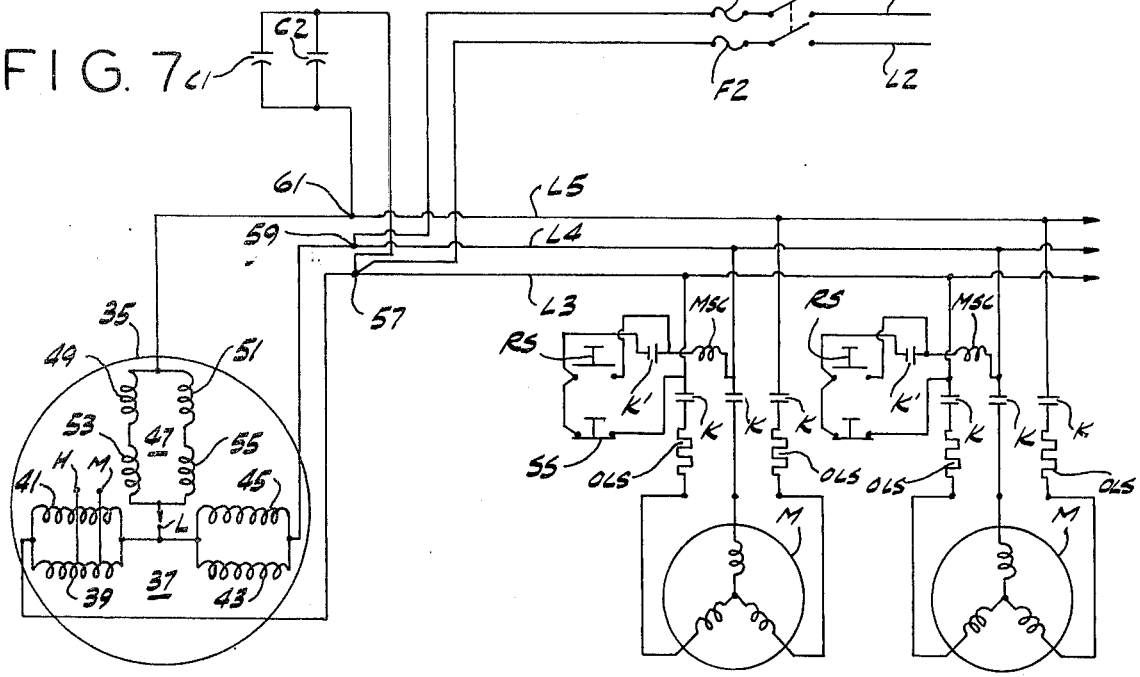
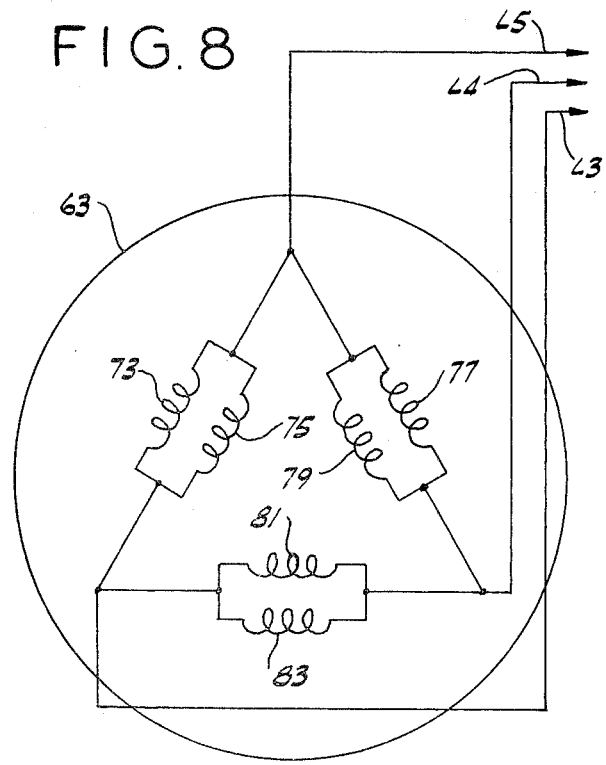
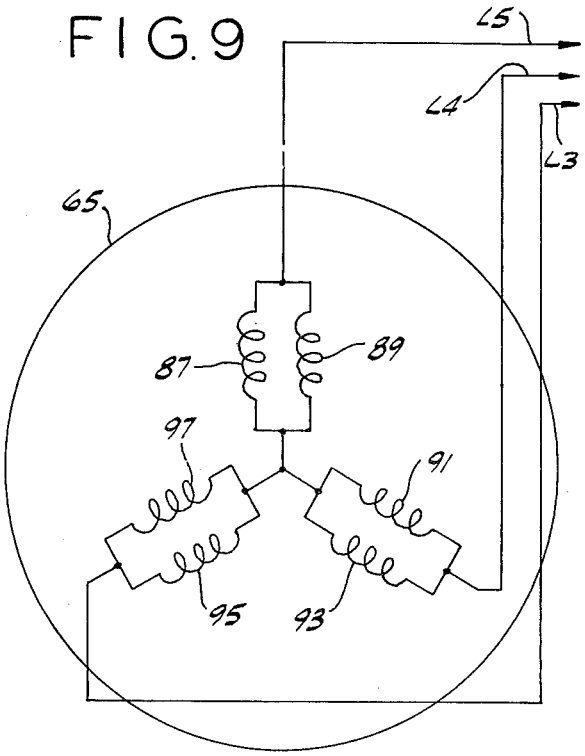

ROTARY DYNAMOELECTRIC MACHINE HAVING HIGH-RESISTANCE ROTOR

This is a continuation, of application Ser. No. 606,588, filed Aug. 21, 1975 now abandoned.

BACKGROUND OF THE INVENTION

This invention relates to a.c. rotary dynamoelectric machines of the squirrel-cage induction type and more particularly to such a machine which can be used as a rotary phase converter or as a motor.

In many localities, as in rural or remote parts of the country, three-phase a.c. utility power is either not provided or not available. Instead, only single-phase service may be supplied. This presents certain problems for utility customers. First, it may be necessary or preferred to operate three-phase equipment. For example, three-phase motors are both widely available, as in integral-horsepower sizes, and desirable because of their efficiency, operating characteristics, and also because three-phase power may at some future time become available. Thus, either three-phase service must be extended to the customer at considerable expense or some type of phase converter must be used to provide conversion of the single-phase power to three-phase power. Previously many rotary phase converters have required relatively expensive and unreliable electrolytic starting capacitors and associated starting relay or switching mechanisms. Moreover, the line voltage supply to these rotary phase converters frequently drops so low that to insure reliable starting an auxiliary or pony motor was required or a time-delay controller was needed together with a bank of starting capacitors, all of which greatly increases the expense of the converter.

Another type of problem which may be encountered, where it is required to operate from a single-phase power source, is that the peak current demand may be limited to a relatively low value. For example, a utility company typically may not permit a demand of greater than 260 amperes from a 230 volt single-phase line, or else may charge a considerable amount for higher demand service. Thus a utility customer desiring to operate a motor is severely restricted as to the size of motor which can be used, since normally a single-phase motor has a starting current which is several times (e.g., 5–6 times) its normal running current. In this example, the customer would be precluded from using a single-phase motor of greater than about 10 horsepower (such a motor having a starting current of 200–240 amperes). Still another difficulty is the need for these motors to start under very high torque loads, such as encountered in the operation of oil field pumps, punch presses and the like.

In order to improve the starting and operating characteristics of such rotary converters and motors, high resistance induction rotors were developed as disclosed in coassigned U.S. Pat. No. 3,670,238. There the squirrel-cage rotors have rotor bars and end rings with substantially reduced cross-sections so that the rotor resistance is two to three times greater than that of rotors of conventional commercial design. While converters and motors with these increased-resistance rotors have greatly improved characteristics, any substantial increase of rotor resistance by further reducing the cross-section of the bars or end rings is impractical because of the limiting effect on the current carrying capacity of these bars and end rings and the rotors loss of structural strength and integrity. Increasing the resistance of the induction rotor by forming the bars and end rings of higher resistance alloys would greatly increase material and fabrication costs and also be impractical in attaining the greatly increased rotor resistance parameters desired.

SUMMARY OF THE INVENTION

Among the several objects of the invention may be noted the provision of an improved rotary dynamoelectric machine; the provision of such a dynamoelectric machine having superior electrical characteristics; the provision of such a dynamoelectric machine which can be employed as either a rotary phase converter for conversion of single-phase a.c. power to three-phase a.c. power, or which can be employed as a motor for operation from either single-phase, two-phase, or three-phase a.c. power, which motor requires relatively low inrush current upon starting; the provision of such a rotary phase converter which is reliably self-starting even at low line voltages, i.e., requires no auxiliary motors, starting capacitors or time-delay controllers and capacitor banks; the provision of such a rotary phase converter which can be used to supply well-balanced three-phase a.c. power from a single-phase source to a wide range of electrical loads and over a wide range of power factors; the provision of such a rotary phase converter permitting ready adjustment, through changing of winding taps or winding interconnections, to accommodate different electrical loads or power factors; the provision of such a motor which is self-starting, requiring minimal size or no starting capacitors and no starting switchgear; the provision of such a motor which can be operated in a motor system such that the maximum inrush current upon motor starting is approximately the same as, or slightly less than, the current supplied to the motor during normal running thereof; the provision of such a motor which develops high starting torque and minimizes the size and cost of starting capacitors required; and the provision of such a dynamoelectric machine which is of relatively simple, inexpensive and easily-manufactured construction and is reliable in operation. Other objects and features will be in part apparent and in part pointed out hereinafter.

Briefly, a rotary dynamoelectric machine constructed in accordance with the invention comprises a generally annular polyphase stator having a predetermined number of wound poles adapted to be interconnected to an a.c. power source and an induction rotor. This rotor has a cylindrical laminated ferromagnetic core positioned within the stator for rotation about a longitudinal central axis thereof when the stator is energized by the power source. The rotor also includes a plurality of electrically conductive bars each extending the length of the core adjacent the cylindrical surface thereof, and conductive end rings at the rotor ends electrically connected to the ends of these bars at the respective ends of the core. At least one of the end rings has a plurality of radial slots therethrough thereby forming a plurality of spaced arcuate ring segments whereby the resistance of the rotor is substantially increased.

BRIEF DESCRIPTION OF THE DRAWINGS

FIG. 5 is a fragmentary cross-sectional view similar to FIG. 4 and showing a rotor modification.

FIG. 6 is a developed view of the segmented end rings and bars of the rotor as shown in FIGS. 1-5;

FIG. 7 is a schematic circuit diagram of a system using a rotary phase converter of the invention for operation of three-phase loads from a single-phase a.c. source;

FIG. 8 is a schematic circuit diagram of a rotary phase converter constructed according to the disclosure and having a delta-wound dual-voltage three-phase stator with the stator coils shown parallel-connected for low-voltage operation;

FIG. 9 is a schematic circuit diagram of a rotary phase converter similar to that of FIG. 8 but with a wye-wound dual-voltage three-phase stator;

Corresponding reference characters indicate corresponding parts throughout the several views of the drawings.

DESCRIPTION OF THE PREFERRED EMBODIMENTS

A highly efficient and economical method of producing three-phase a.c. power from a single-phase source involves the use of a rotary phase converter. As described herein, such a converter is a rotary transformer with which capacitors are interconnected to supply balanced three-phase power to a load such as one or more three-phase motors. In accordance with this invention, such a rotary transformer is constructed substantially in accordance with motor theory and is, in fact, in the form of a motor. I.e., the machine includes a generally annular stator with a predetermined number of wound poles (as is conventional) and an induction rotor of the squirrel-cage type, there being no need for an output shaft, however.

The stator, for example, may have two primary windings which are displaced 90° out of phase, such as the Scott "T" type, with each of the windings constituted by a set of coils arranged in belts providing, for example, a four-pole configuration. The more conventional three-phase delta and wye-wound stator configurations are further examples of such polyphase stator structures for machines of this invention.

The rotor is of special construction. It includes a set of parallel bars electrically connected to end rings at each end of the rotor to provide a secondary winding comprising a plurality of series-parallel-connected turns. The end rings are especially configured by being radially slotted therethrough to provide a plurality of spaced arcuate ring segments thereby constituting a secondary winding with resistance which is much higher than what has heretofore been considered good conventional design practice.

Figure 4:
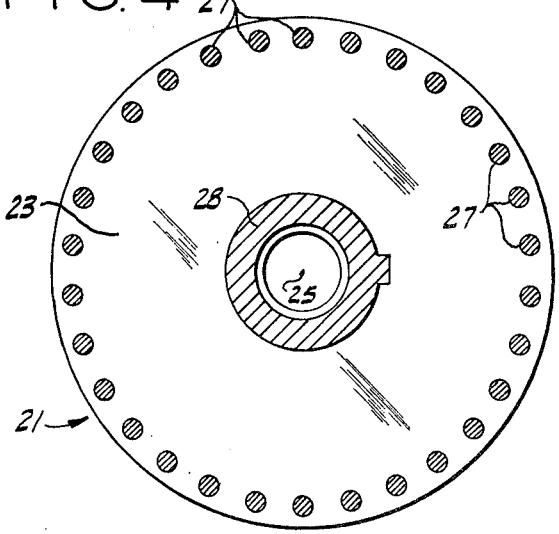
FIG. 4 is a lateral cross-sectional view of the rotor taken along line 4—4 of FIG. 1.

A rotor of the present invention is shown in FIGS. 1-6 wherein the rotor is designated generally 21. It comprises a cylindrical core of numerous individual ferromagnetic laminations 23 each of circular cross section as shown in FIG. 4. The rotor is of course adapted for rotation within the bore of a stator about a longitudinal central axis 25. Rotor 21, for example, includes thirty substantially identical bars 27 each of circular cross section. Other cross sections can be employed, but the circular form is preferred in the construction of a rotary dynamoelectric machine of this invention. Bars 27 are parallel to one another and extend the length of respective peripheral slots so that the bars are adjacent the cylindrical surface of the core. The bars are slightly skewed with respect to axis 25, as is conventional, the skew angle being approximately 1° to $1\frac{1}{4}$°, so that the bars will each overlap one set of stator slots to prevent the rotor from stalling or locking up. It will be understood that double as well as single-bar construction may be employed. In a double-bar squirrel cage rotor construction a second set of rotor bars identical to bars 27 are positioned substantially parallel thereto but spaced inwardly somewhat.

Bars 27 are preferably of aluminum and are advantageously provided by a method of centrifugal casting. This method casts the bars integrally with end rings and cooling fins. Rather than employing this method, the rotor can be built with copper bar construction, as is typically utilized in assembling motors having high horsepower ratings. In that event, the copper bars are solidly connected to end ring segments. In either type of construction, the bars are thus electrically connected to end ring segments.

Rotor 21 is shown as having a stub shaft 28 useful in maintaining alignment of the laminations 23 during the casting process. Stub shaft 28 is keyed to the laminations as indicated. The casting process is such that molten aluminum passes down through stub shaft 28 and then, under centrifugal force, forms the lower end rings and fins, passes upward through the slots to form the bars and, finally, continues upwardly to form the upper end ring and fins. The stub shaft is later pressed out and replaced with a suitable finished shaft which is keyed to the rotor and extends from opposite ends of the rotor and which can be journalled in bearings for rotation within the stator bore.

These end rings are designated 29 and are substantially identical, each being of generally flat, washer-like form and of rectangular cross section, thus having a generally uniform thickness along axis 25. Each end ring 29 includes ten equispaced cooling fins 31 cast integrally with the end ring. Small frustoconical projections 33 also extend longitudinally outwardly from each end ring 29 and are useful in balancing the rotor. Small balancing weights in the form of washers may be secured to the rotor by the projections 33 when the latter are deformed.

Figure 1:
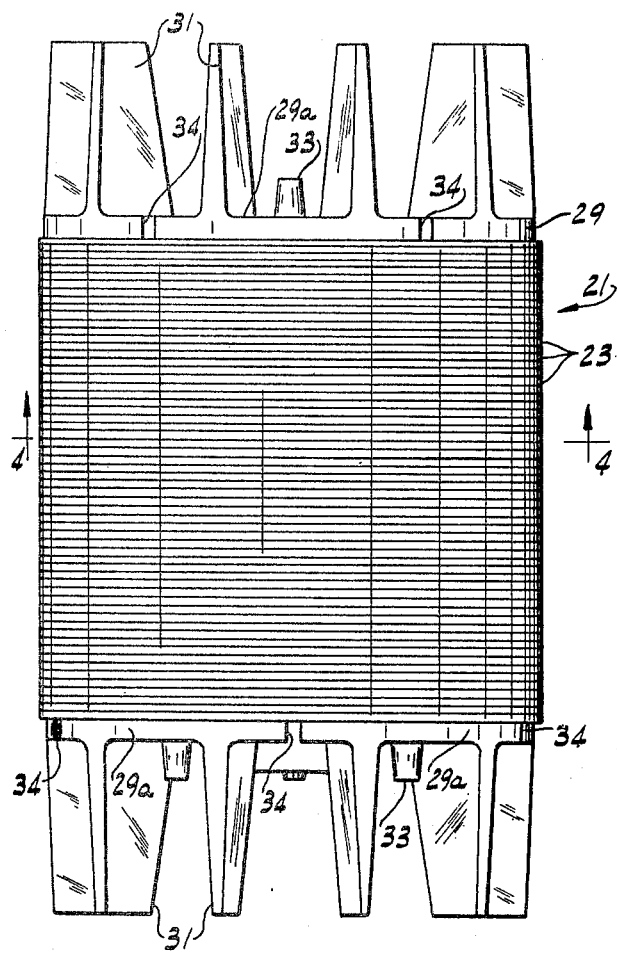
FIG. 1 is a view in side elevation of the rotor of an improved rotary dynamoelectric machine constructed according to this invention.
Figure 3:
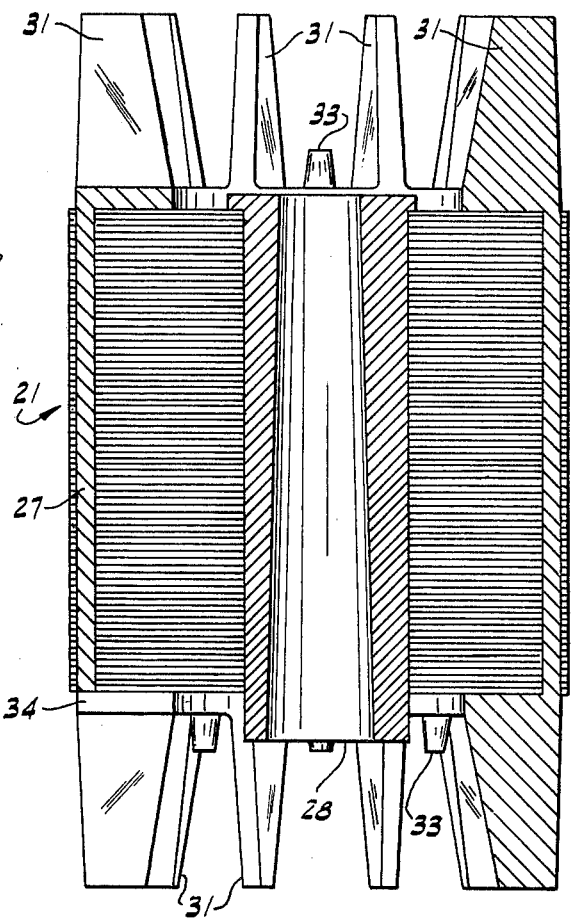
FIG. 3 is a revolved longitudinal cross-sectional view of the FIG. 1 rotor taken along line 3—3 of FIG. 2.
Figure 2:
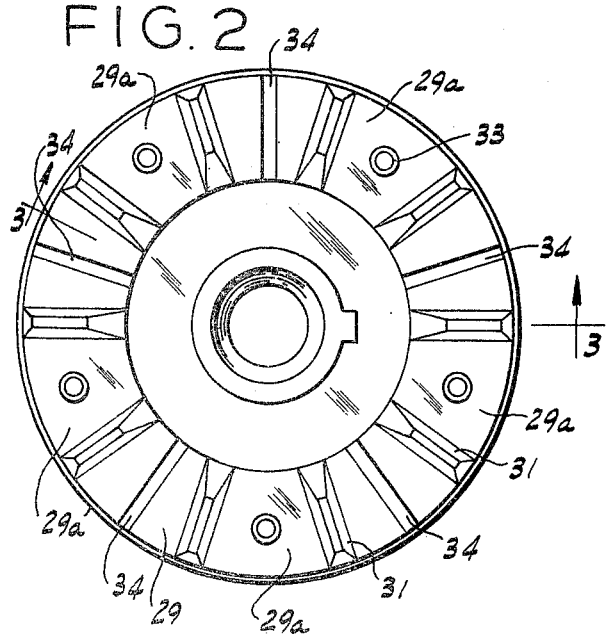
FIG. 2 is an end elevational view of the FIG. 1 rotor.

Each of the end rings 29 is shown to have several radial slots 34 thus forming a plurality of spaced arcuate ring segments 29a of equal length. While only one of two end rings may be so segmented, it is preferred that both are identically slotted and that the slots 34 in one end ring are circumferentially offset around the rotor (as shown in FIG. 1) relative to the slots 34 in the other end ring. Each end ring has an odd number of slots, each of which carry completely through each end ring, and the number of slots is preferably other than a multiple or a submultiple of the number of wound stator poles. For example, if a four pole stator is employed, one should have 5 or 7 slots in the rotor rather than 2, 3, 4 or 6 slots. This avoids any tendency for the rotor stopping in a so-called "dead-spot" position wherein it would have difficulties in restarting. Conceivably 2, 4 or 6 slots, or 3 slots (because of 3-phase stator energization), would subject the machine to this dead-spot difficulty. Further, if a six pole stator configuration is utilized, the number of slots is preferably 5, 7 or 9.

As a result of this segmented end-ring construction the rotor bars are, as illustrated in FIG. 6, electrically connected in a series-parallel configuration rather than in the conventional parallel configuration thus the current will be carried from one end ring segment to another in a series fashion through a number (3 as shown in FIGS. 1-6) of parallel-converted bars. This provides a marked and advantageous increase in rotor resistance of at least three and typically 5-10 times that of a conventional commercial design squirrel-cage rotor. An increase of such magnitude in rotor resistance by using reduced cross section bars and rings or higher resistance alloys therefor would not be practicably feasible. In accordance with the present invention conventional centrifugal rotor casting methods using aluminum may be utilized and the slots merely milled or cast in the end rings.

In using rotor 21 in a rotary phase converter of the invention, it is preferred that the rotor be turned down to reduce its diameter slightly so that each of the bars 27 has a small portion of its peripheral surface along its entire length exposed at the periphery of the rotor, as illustrated in FIG. 5, which shows a portion of a lamination 23' whose diameter is slightly reduced from that shown in FIG. 4. Thus a partially opened slot configuration results which increases the rotor reactance for improving starting characteristics somewhat over the completely closed slot configuration of FIGS. 1-4.

While it might be expected that such a high resistance rotor would cause serious shortcomings in performance, a rotary dynamoelectric machine of such construction unexpectedly provides superior electrical characteristics and great flexibility. Not only does this construction result in a particularly efficient rotary phase converter, but also such a rotary converter which is self-starting, i.e., which does not require expensive electrolytic starting capacitors and associated switchgear, even under extremely low line voltage conditions. Flexibility is provided in that such a dynamoelectric machine can also be used as a motor having certain marked advantages. For example, as a motor, the machine also exhibits a self-starting capability, requiring no, or a minimal size of, electrolytic capacitors, no switchgear, and so forth. Significantly also, such a motor requires relatively low inrush current upon starting and, in fact, can be connected so that the inrush current is approximately the same or actually less than the normal running current under full-load conditions. Moreover, the motors of this invention exhibit particularly high starting torque characteristics.

That such a rotary phase converter, or rotary transformer, can be designed according to motor theory follows from the operative principle that a polyphase induction motor is, in principle, a transformer whose magnetic circuit is separated by an air gap into two relatively movable portions, viz., stator and rotor. The stator includes the primary windings while the rotor provides the secondary winding in which the currents are created by induction. At standstill, the equivalence of a rotary converter to a polyphase transformer is thus readily apparent. Conventionally, motor design theory takes such considerations into account. Common practice is to use the so-called Steinmetz equivalent circuit to evaluate motor performance according to established circuit theory. Thus performance calculations can be undertaken to determine torque, power factor, and other performance characteristics as functions of various material properties, dimensions, or other motor design factors. Such motor design theory is conventionally employed in the design of motors and is discussed, for example, in the *Standard Handbook for Electrical Engineers* (Fink and Carroll, ed.) 10th ed., McGraw-Hill Book Company, 1968.

Referring now to FIGS. 7-9, circuit diagrams are shown which illustrate the features and operation of the present rotary phase converter. Such a rotary converter is designated 35 having a Scott "T" stator which includes a first winding 37 having a set of four interconnected coils 39-45 corresponding to four stator poles. A second winding 47 includes a set of four similarly connected coils 49-55. Winding 47 is oriented at 90° electrical phase relationship with respect to winding 37. Each of the windings has its coils connected in a parallel pair arrangement. The number of turns in each winding from end to end is such that winding 47 has approximately 0.845 the number of effective turns of winding 37. Accordingly, winding 47 may be thought of as the 84.5% winding and winding 37 may be regarded as the 100% winding.

Winding 37 includes three taps designated L, M and H, the latter two being provided on both of coils 39 and 41 and being tied together as indicated. The lower end of winding 47 is adapted to be connected to one of these taps, which correspond to low, medium and high, the tap connection being chosen to provide phase balance according to the magnitude and characteristics of the three-phase load to which converter 35 supplies the three-phase power. It will be understood that such taps and the lower end of winding 47 are made accessible by leads connected thereto which are brought out of the converter housing. Tap L is located at the midpoint of winding 37 while taps M and H are at approximately 12% and 25% of the effective span of this winding from centerpoint tap L. Thus tap H is approximately at the midpoint of each of coils 39 and 41, while tap M is approximately midway between taps L and H.

Single-phase a.c. power, e.g., of 230 v. at 60 Hz, is supplied across winding 37 via a pair of terminals 57 and 59 by means of power leads L1 and L2 which include a ganged main power switch PS and a pair of fuses F1 and F2. To a third terminal 61 is connected to the upper end of winding 47. A capacitance includes a plurality of capacitors, here shown as two capacitors C1 and C2, which are connected across terminals 57 and 61. Thus winding 47 is connected in series with this capacitance from the right end of winding 37 and one of the taps, tap L being shown connected here.

When power switch PS is closed, rotary converter 35 is energized and thus starts and its rotor comes up to synchronous speed, i.e., 1800 RPM. Three-phase a.c. power at 230 v. and 60 Hz is then supplied via power leads L3-L5 connected to terminals 57-61, respectively. As is seen, these terminals 57 and 59 are interconnected with the opposite ends of winding 37 and terminal 61 represents the junction between winding 47 and the capacitance C1 and C2.

Two three-phase wye-wound induction motors are shown connected for operation from leads L3–L5, each being conventionally equipped with a motor starter contactor MSC each having main power contacts K connected between each motor M and leads L3–L5. The coil of each contactor MSC is energized upon momentary closure of a normally-open pushbutton start or run switch RS. A pair of latching contacts K' of the contactor MSC is connected across each run switch RS for maintaining contactor energization. Each motor M can be stopped by momentary opening of a normally-closed pushbutton stop switch SS connected in series with the contactor coil. Conventional bimetal overload switches OLS are connected within motor leads.

The amount of capacitance C1 and C2 required for satisfactory phase balance is dependent upon the output load capability of the converter and the size of the three-phase load connected to it. The capacitance should total about 25 mfd. per h.p. of the total motor load the converter can handle. For example, if a converter can handle a total motor load of 40 h.p., the capacitance should be at least $40 \times 25$ mfd. $= 1000$ mfd. In addition, the capacitance should be increased by about 25 mfd. per h.p. of connected load. Thus, if motors totalling 10 h.p. are operated by the converter, the total capacitance may be increased by 250 mfd. Increased capacitance is normally used only when the connected load exceeds one-half of the rotary converter's rated horsepower. Some of this additional capacitance may be connected, as required, only when a selected one of the motors is operated, rather than always being connected as shown in FIG. 7.

While the present rotary converter provides particular advantages in operating motor loads which are inductive in character and produce a large lagging power factor, the converter may also be used to operate loads which have a lower power factor, or even a unity or leading power factor. As the lagging power factor becomes lower, the taps L, M and H are chosen for proper phase balance, tap L being that suitable for the least load and power factors nearest unity. If the load approaches a unity power factor or produces a leading rather than lagging current, it may be necessary to reverse the ends of winding 37. Hence a load causing a leading power factor can be operated with satisfactory phase balance. Thus, regardless of load, well-balanced phase-to-phase voltages will exist under all conditions for which adjustments are made.

Moreover, when motors are operated using the rotary converter under normal load conditions, the overall power factor produced at the single-phase input leads L1 and L2 is near unity. This is an important advantage for power suppliers, since nearly all of the current serves as useful power. In operating motors using this converter, either delta or wye-wound motors may be employed. Instant reversal types as well as many other special types of three-phase motors may also be operated. In general, motor loads requiring as much as 200% of full-load torque may be started using the converter. Thus also, a breakdown torque of nearly twice full-load torque is possible, with even greater possible breakdown torque if several motors are being simultaneously operated from the converter. Relatively little power loss is produced by the converter itself when operating motors, e.g., of the order of 2% of the combined electric power load.

Referring now to FIG. 8, a rotary converter 63 of this invention is shown connected for supplying three-phase a.c. power via leads L3–L5. Converter 63 is similar in connection and operation to that of FIG. 7 except that a delta configuration stator rather than a Scott "T" is utilized. This stator comprises three pairs of symmetrical coils 73, 75 and 77, 79 and 81, 83 each pair being oriented at a 60° electrical phase relationship to each other. The coils of each individual pair are in the electrical and magnetic phase with each other so that they may be connected in parallel as shown for supplying a lower voltage, or in series to provide a doubled voltage so that, for example, 460 v. three-phase power can be supplied from a 230 v. single-phase source.

The embodiment of FIG. 9 shows a rotary converter 65 connected for supplying three-phase power from a single phase source, differing only from the converter of FIG. 8 in that three pairs of coils 87, 89 and 91, 93 and 95, 97 are connected in a wye configuration. It will be understood that all other generally accepted stator configurations as described in NEMA (National Electrical Manufacturers Association) Standard Publication No. MG1-72 in sections MG1-2.60 through MG1-2.67 may be utilized in not only the rotary converters but also the motors of this invention.

Figure 10:
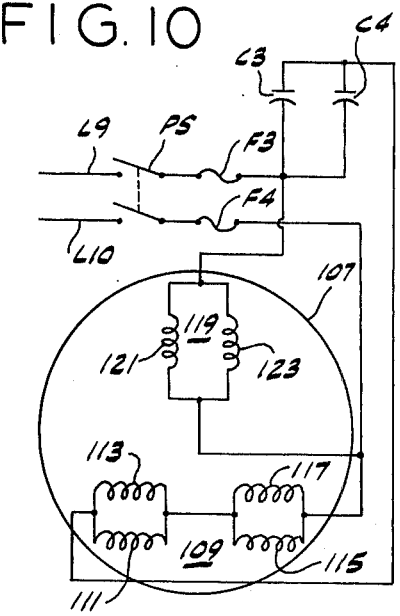
FIG. 10 is a schematic circuit diagram of a motor of the invention connected for self-starting operation from a single-phase a.c. source.
Figure 11:
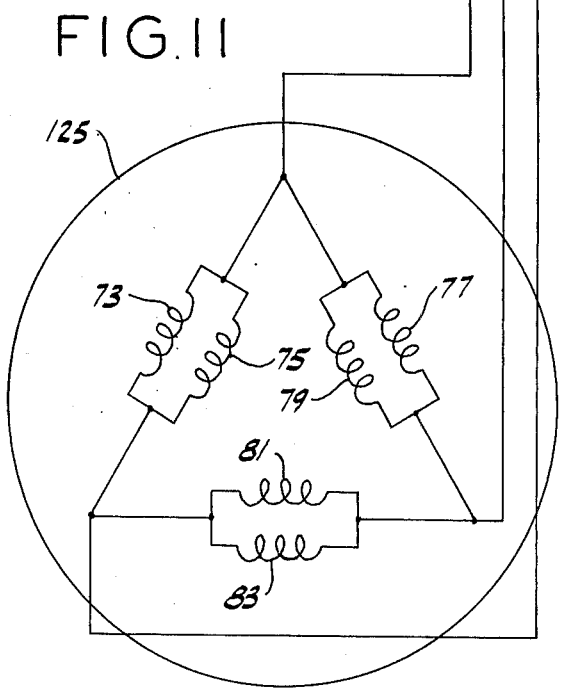
FIG. 11 is a schematic circuit diagram of a motor of the invention with a delta-wound dual-voltage three-phase stator with the stator coils shown parallel-connected for low-voltage operation.
Figure 12:
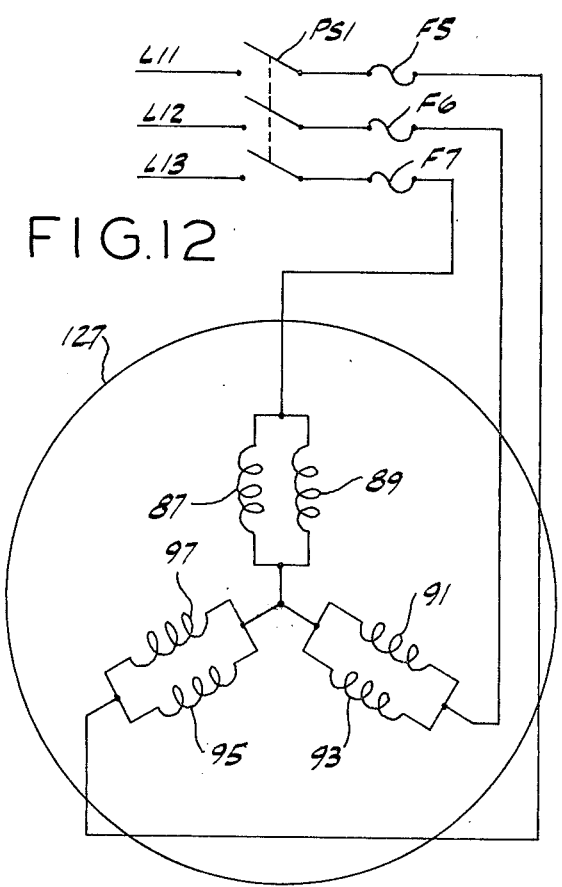
FIG. 12 is a schematic circuit diagram illustrating a motor of this invention similar to that of FIG. 11 but with a wye-wound dual-voltage three-phase stator.

Referring now to FIGS. 10–12, circuit diagrams are shown which illustrate the use of the invention as a motor. FIG. 10 shows a motor 107 constructed in accordance with the foregoing considerations. The 100% winding is designated 109 and is shown as having four coil sections 111–117 of two each in parallel. The 84.5% winding, which is oriented at 90° electrical phase relationship with respect to winding 109, is designated 119 and is here shown for clarity of illustration as having only two sections 121 and 123. However, each of these is actually two coil set as in the construction of the rotary converter shown in FIGS. 7–9.

A capacitance, including a plurality of capacitors of which two are shown and designated C3 and C4, is connected in series with winding 109 across a pair of power leads L9 and L10 which supply single-phase a.c. power, e.g., of 230 v., when a main power switch PS is closed. These leads include fuses F3 and F4. Winding 119 is connected across leads L9 and L10. Capacitors C3 and C4, it should be noted, are of the conventional oil-filled type, and are not the electrolytic type used for starting purposes. Upon closing power switch PS, motor 107 starts satisfactorily without starting capacitors and operates as a normal motor. Thus it is self-starting. Significantly, the inrush current upon starting is relatively low, being typically from about two to about three times the normal running, i.e., full-load current. The slip is typically about 3–4%.

It will be understood that except for providing an output shaft or shafts on the rotor of FIGS. 1–6 the rotors used in the motors of this invention are otherwise the same as utilized in the rotary converters described above.

FIGS. 11 and 12 illustrate two further motor embodiments of this invention in which the above-described rotor construction is employed and the motor is supplied from a three-phase power source L11, L12, L13 by means of a power switch PS1 and via customary fuses F5, F6 and F7. The stator of motor 125 is the same as that of rotary coverter 63 of FIG. 8 while motor 127 has a stator which corresponds to that of converter 65 of FIG. 9. These motors of FIGS. 10–12 have particularly high starting torque characteristics.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A rotary dynamoelectric machine comprising:
   a generally annular polyphase stator having a predetermined number of wound poles adapted to be interconnected to an a.c. power source; and
   an induction rotor including a cylindrical laminated ferromagnetic core positioned within said stator for rotation about a longitudinal central axis thereof when said stator is energized by the power source, said rotor having a plurality of electrically conductive bars each extending the length of the core adjacent the cylindrical surface thereof, and conductive end rings at the ends of said rotor electrically connected to the ends of said bars at the respective ends of the core, at least one of said end rings having a plurality of radial slots therethrough thereby forming a plurality of spaced arcuate ring segments whereby the resistance of said rotor is substantially increased, the number of said radial slots being an odd number which is other than a multiple or submultiple of the predetermined number of stator poles thereby to avoid dead-spot positions at which the rotor may stop and from which it is difficult to restart.

2. A rotary dynamoelectric machine as set forth in claim 1 wherein the ring segments are of equal lengths.

3. A rotary dynamoelectric machine as set forth in claim 2 wherein both end rings are radially slotted and the slots in one end ring are offset circumferentially around the rotor relative to the slots in the other end ring.

4. A rotary dynamoelectric machine as set forth in claim 3 wherein the resistance of said rotor is at least approximately three times that of such a squirrel-cage motor rotor with unsegmented end rings.

5. A rotary dynamoelectric machine as set forth in claim 4 wherein the resistance of said rotor is approximately equal to from approximately five to ten times the resistance of such a squirrel-cage motor rotor with unsegmented end rings.

6. A rotary dynamoelectric machine as set forth in claim 3 wherein said conductive bars are of generally circular cross section.

7. A rotary dynamoelectric machine as set forth in claim 6 wherein each of said bars has a portion of its surface along its length exposed at the periphery of the rotor.

8. A rotary dynamoelectric machine as set forth in claim 1 wherein the stator is a three-phase stator.

9. A rotary dynamoelectric machine as set forth in claim 8 wherein the stator is delta-wound.

10. A rotary dynamoelectric machine as set forth in claim 8 wherein the stator is wye-wound.

11. A rotary dynamoelectric machine as set forth in claim 1 wherein the stator includes a first primary winding and a second primary winding oriented at 90° electrical phase relationship with respect to said first winding, said second winding having approximately 0.845 the number of effective turns of said first winding, said windings being adapted for interconnection to a source of single-phase a.c. power, and wherein said rotor bars and the segmented end rings constitute a secondary winding.

12. A rotary dynamoelectric machine as set forth in claim 11 constituting a rotary phase converter and wherein at least a portion of said first winding is adapted for connection across the a.c. power source, and wherein said second winding is adapted for serial connection with a capacitance from one end of a portion of said first winding to an intermediate tap on said first winding, whereby said dynamoelectric machine constitutes a self-starting rotary phase converter providing three-phase a.c. power at three terminals comprising the opposite ends of portions of said first winding and the junctions between the capacitance and said second winding.

13. A rotary dynamoelectric machine as set forth in claim 11 constituting a motor and wherein said first winding is adapted for connection with a capacitance across said a.c. source, said second winding being adapted for connection across said source whereby relatively low inrush current is required upon starting and relatively high starting torque is developed.

14. A rotary dynamoelectric machine as set forth in claim 1 constituting a motor and having a three-phase stator adapted for connection to a three-phase power source.

15. A rotary dynamoelectric machine as set forth in claim 14 wherein the stator is delta-wound.

16. A rotary dynamoelectric machine as set forth in claim 14 wherein the stator is wye-wound.

* * * * *